(12) United States Patent
Nakamura

(10) Patent No.: US 8,134,747 B2
(45) Date of Patent: Mar. 13, 2012

(54) PRINT CONTROL DEVICE AND PRINT CONTROL PROGRAM

(75) Inventor: Tomohiro Nakamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 528 days.

(21) Appl. No.: 12/468,740

(22) Filed: May 19, 2009

(65) Prior Publication Data

US 2009/0323143 A1 Dec. 31, 2009

(30) Foreign Application Priority Data

Jun. 25, 2008 (JP) ................................ 2008-165939

(51) Int. Cl.
*G03F 3/08* (2006.01)

(52) U.S. Cl. ........ 358/1.9; 358/3.23; 358/518; 358/523; 358/524; 345/594

(58) Field of Classification Search ................... 358/1.9, 358/518, 523, 524, 3.23; 345/589, 591, 594
See application file for complete search history.

(56) References Cited

U.S. PATENT DOCUMENTS

| | | | | |
|---|---|---|---|---|
| 4,648,046 | A | * | 3/1987 | Copenhaver et al. ......... 345/589 |
| 2008/0062193 | A1 | * | 3/2008 | Olson ........................... 345/591 |
| 2008/0062442 | A1 | * | 3/2008 | Olson ............................ 358/1.9 |
| 2008/0062443 | A1 | * | 3/2008 | Olson ............................ 358/1.9 |
| 2008/0074686 | A1 | * | 3/2008 | Naito et al. ..................... 358/1.9 |

FOREIGN PATENT DOCUMENTS

JP 2003-216355 7/2003

* cited by examiner

*Primary Examiner* — Kimberly A Williams
(74) *Attorney, Agent, or Firm* — DLA Piper LLP (US)

(57) ABSTRACT

A print control device that controls a printing process using registered color conversion information includes: a generating unit that, when a user edits the registered color conversion information, adds access authority information indicating that the color conversion information is user color conversion information used by only a predetermined user or common color conversion information that can be used by all users to the color conversion information to generate new edited color conversion information; and a registration unit that determines whether the edited color conversion information generated by the generating unit can be registered and whether the edited color conversion information is registered as the user color conversion information or the common color conversion information, on the basis of the access authority information and the registration state of the color conversion information, and registers the edited color conversion information on the basis of the determination result.

5 Claims, 8 Drawing Sheets

FIG. 2

| | |
|---|---|
| STANDARD 1 : | STANDARD COLOR TABLE 1 |
| STANDARD 2 : | STANDARD COLOR TABLE 2 |
| ⋮ | ⋮ |
| STANDARD N : | STANDARD COLOR TABLE N |
| CUSTOM 1 : | (UNREGISTERED) |
| CUSTOM 2 : | (UNREGISTERED) |
| ⋮ | ⋮ |
| CUSTOM M : | (UNREGISTERED) |
| BUFFER 1 : | STANDARD 1_USER A<br>COLOR TABLE 1 FOR USER A |
| BUFFER 2 : | STANDARD 1_USER B<br>COLOR TABLE 1 FOR USER B |
| BUFFER 3 : | STANDARD 1_PUBLIC<br>PUBLIC COLOR TABLE 1 |

FIG. 3

| | | | |
|---|---|---|---|
| 1 : | BUFFER 1 : | BUFFER 3 : | STANDARD 1 : |
| 2 : | STANDARD 2 : | | |
| ⋮ | ⋮ | ⋮ | ⋮ |
| N : | STANDARD N : | | |

FIG. 7C

| | |
|---|---|
| STANDARD 1: | STANDARD COLOR TABLE 1 |
| STANDARD 2: | STANDARD COLOR TABLE 2 |
| ... | ... |
| STANDARD N: | STANDARD COLOR TABLE N |
| CUSTOM 1: | (UNREGISTERED) |
| CUSTOM 2: | (UNREGISTERED) |
| ... | ... |
| CUSTOM M: | (UNREGISTERED) |
| BUFFER 1: | STANDARD1_USERA COLOR TABLE 1 FOR USER A |
| BUFFER 2: | STANDARD1_USERB COLOR TABLE 1 FOR USER B |
| BUFFER 3: | STANDARD1_PUBLIC PUBLIC COLOR TABLE 1 |

FIG. 7A

COLOR TABLE:

| |
|---|
| COLOR TABLE 1 FOR USER A ▶ |
| COLOR TABLE 1 FOR USER A |
| STANDARD COLOR TABLE 2 |
| .... |
| STANDARD COLOR TABLE N |

COLOR TABLE:

| |
|---|
| COLOR TABLE 1 FOR USER B ▶ |
| COLOR TABLE 1 FOR USER B |
| STANDARD COLOR TABLE 2 |
| .... |
| STANDARD COLOR TABLE N |

FIG. 7D

| 1: | BUFFER 1: | BUFFER 3: | STANDARD 1: |
|---|---|---|---|
| 2: | STANDARD 2: | .. | .. |
| ... | | | |
| N: | STANDARD N: | | |

FIG. 8A

| COLOR TABLE: | PUBLIC COLOR TABLE 1 ▶ |
|---|---|
| | PUBLIC COLOR TABLE 1 |
| | STANDARD COLOR TABLE 2 |
| | .... |
| | STANDARD COLOR TABLE N |

| COLOR TABLE: | COLOR TABLE 1 FOR USER B ▶ |
|---|---|
| | COLOR TABLE 1 FOR USER B |
| | STANDARD COLOR TABLE 2 |
| | .... |
| | STANDARD COLOR TABLE N |

FIG. 8C

| STANDARD 1: | STANDARD COLOR TABLE 1 |
|---|---|
| STANDARD 2: | STANDARD COLOR TABLE 2 |
| ... | .... |
| STANDARD N: | STANDARD COLOR TABLE N |
| CUSTOM 1: | (UNREGISTERED) |
| CUSTOM 2: | (UNREGISTERED) |
| ... | .... |
| CUSTOM M: | (UNREGISTERED) |
| BUFFER 1: | STANDARD1_USER B COLOR TABLE 1 FOR USER B |
| BUFFER 2: | STANDARD1_PUBLIC PUBLIC COLOR TABLE 1 |

FIG. 8D

| 1: | BUFFER 2: | STANDARD 1: |
|---|---|---|
| 2: | | STANDARD 2: |
| ... | | .. |
| N: | | STANDARD N: |

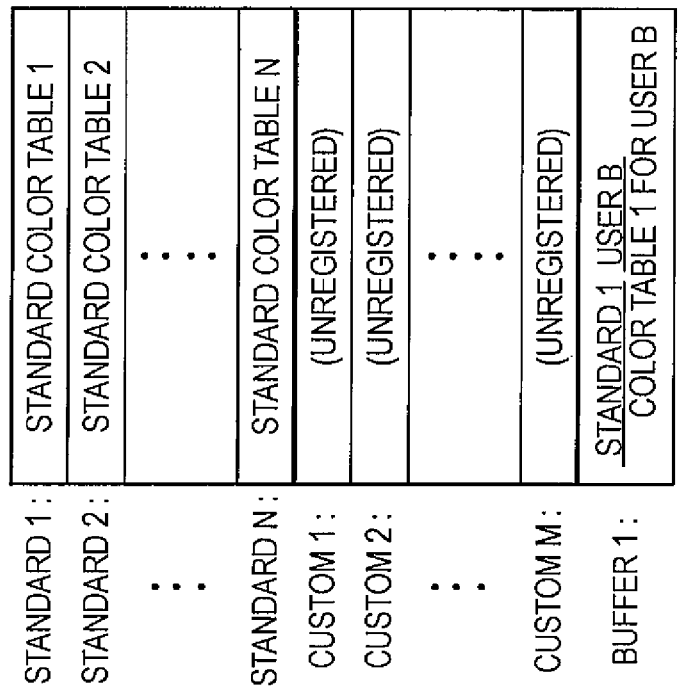
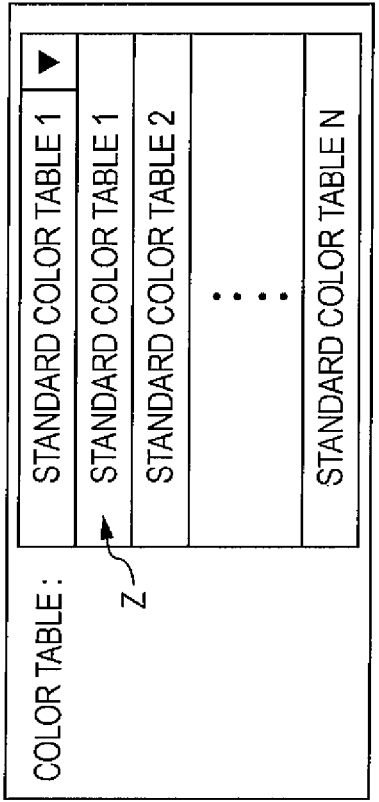
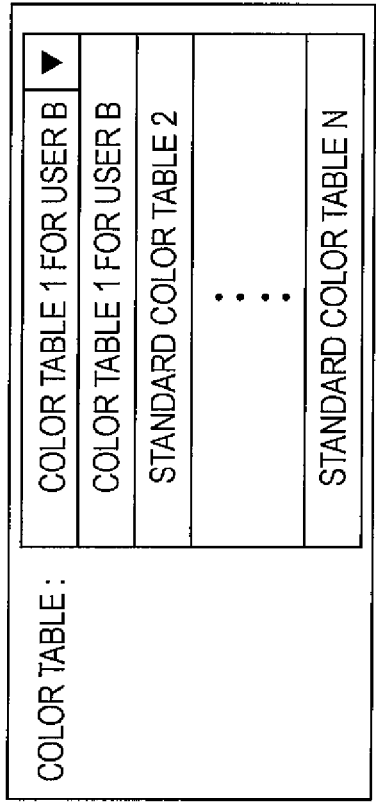
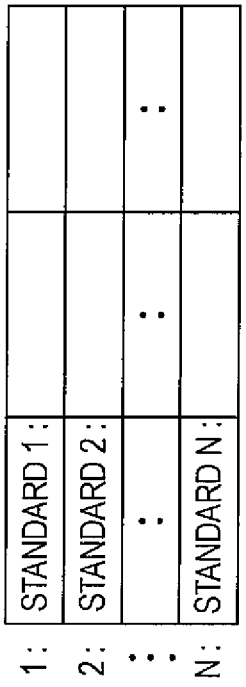

PRINT CONTROL DEVICE AND PRINT CONTROL PROGRAM

BACKGROUND

1. Technical Field

The present invention relates to a print control device for a printing process, and more particularly, to a print control device capable of improving user operability for information for a color conversion process and effectively utilizing hardware resources.

2. Related Art

In general, in a printing-out process of, for example, a printer, various image processing operations are performed on image data, which is a print target, and the processed image data is printed on a printing medium. During the image processing, generally, a color conversion process is performed to convert the color of an image into another color in a different color space or change the grayscale value of each color in the same color space. For example, when image data of a print target is represented by an RGB format and a printer uses colors in a CMYK format, the color conversion process is performed to convert RGB data into CMYK data. In order to perform the color conversion process, generally, conversion information, such as a color conversion table, is stored in the printer, and is used for a printing process.

JP-A-2003-216355 discloses a technique for registering profile data used for a color conversion process in a printer.

In some cases, in order to check an output color when a rotary press is used to print a large number of copies, a general printer is used for the simulation output. In this case, it is necessary to reflect the color characteristics of the rotary press in a table (information) for the color conversion process such that the output of the simulated rotary press is matched with a standard color. Therefore, in some cases, the color conversion table is changed for each rotary press to be simulated, and a plurality of color conversion tables is stored in one printer.

However, the related art storing the color conversion information (table) does not disclose a technique for storing the color conversion information for each printer user, and there are problems in storage capacity or in the use of a user interface.

In the simulation of the printer, when a plurality of users uses one printer, the evaluation of the output color of the same rotary press varies depending on the user. Therefore, in some cases, a color conversion table for each user is stored in one rotary press. In addition, it is considered that the users use their own rotary presses. Therefore, in this case, the color conversion table is managed by each user. In the storing method according to the related art, there is a concern that a user will use the color conversion table of another user. In addition, in a structure in which a plurality of color conversion tables is freely stored, a large-capacity storage area is used, which is not preferable. Further, a large number of color conversion tables are displayed on an interface screen for allowing the user to select a color conversion table. Therefore, user convenience is lowered.

SUMMARY

An advantage of some aspects of the invention is that it provides a print control device for a printing process capable of improving user operability for information for a color conversion process and effectively utilizing hardware resources.

According to an aspect of the invention, there is provided a print control device that controls a printing process using registered color conversion information. The print control device includes: a generating unit that, when a user edits the registered color conversion information, adds access authority information indicating that the color conversion information is user color conversion information used by only a predetermined user or common color conversion information that can be used by all users to the color conversion information to generate new edited color conversion information; and a registration unit that determines whether the edited color conversion information generated by the generating unit can be registered and whether the edited color conversion information is registered as the user color conversion information or the common color conversion information, on the basis of the access authority information and the registration state of the color conversion information, and registers the edited color conversion information on the basis of the determination result.

In the print control device according to the above-mentioned aspect, the edited color conversion information may be generated for each of one or more standard color conversion information items, and the number of edited color conversion information items registered for each standard color conversion information may be limited.

In the print control device according to the above-mentioned aspect, when the registration unit determines that the edited color conversion information is registered as the common color conversion information and the user color conversion information of the user who has performed the editing operation has already been registered for the standard color conversion information for which the edited color conversion information is registered, the user color conversion information may be deleted.

The print control device according to the above-mentioned aspect may further include a display unit that, when receiving a request to perform the printing process, displays an interface screen that allows the user to select the color conversion information used for the printing process. For the color conversion information that can be used by the user who requests the printing process, the name of the standard color conversion information and the name of one color conversion information item having the highest priority among the edited color conversion information items registered for the standard color conversion information may be displayed for each standard color conversion information on the interface screen.

According to another aspect of the invention, there is provided a print control program that allows a computer for controlling a printing process using registered color conversion information to perform the functions of: when a user edits the registered color conversion information, adding access authority information indicating that the color conversion information is user color conversion information used by only a predetermined user or common color conversion information that can be used by all users to the color conversion information to generate new edited color conversion information; and determining whether the generated edited color conversion information can be registered and whether the generated edited color conversion information is registered as the user color conversion information or the common color conversion information, on the basis of the access authority information and the registration state of the color conversion information, and registering the edited color conversion information on the basis of the determination result.

Other objects and features of the invention can be apparent from the following exemplary embodiments of the invention.

BRIEF DESCRIPTION OF THE DRAWINGS

The invention will be described with reference to the accompanying drawings, wherein like numbers reference like elements.

FIG. 2 is a diagram illustrating an example of a registered color table.

FIG. 3 is a diagram illustrating an example of a priority table.

FIGS. 7A to 7D are diagrams illustrating an example of the display of the selection of a color table.

FIGS. 8A to 8D are diagrams illustrating an example of the display of the selection of a color table.

FIGS. 9A to 9D are diagrams illustrating an example of the display of the selection of a color table.

DESCRIPTION OF EXEMPLARY EMBODIMENTS

Figure 1:
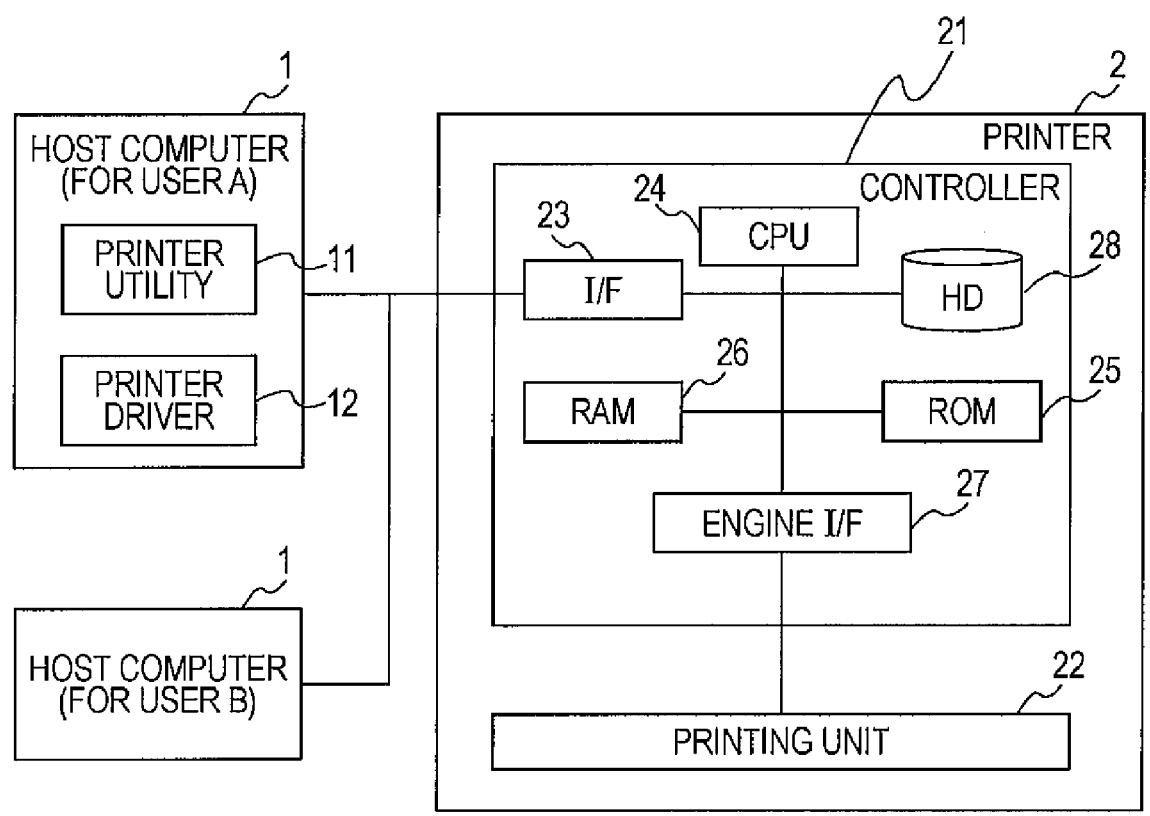
FIG. 1 is a diagram illustrating the structure of a host computer and a printer operated under the control of the host computer according to an embodiment of the invention.

Hereinafter, exemplary embodiments of the invention will be described with reference to the accompanying drawings. However, the exemplary embodiments do not limit the technical scope of the invention. In the drawings, the same or similar components are denoted by the same reference numerals or reference symbols.

FIG. 1 is a diagram illustrating the structure of a host computer and a printer operated under the control of the host computer according to an embodiment of the invention. A host computer 1 shown in FIG. 1 is a print control device according to the embodiment of the invention, and includes a printer utility 11. The printer utility 11 registers a new color table which is edited by a user and has access authority added thereto to a printer 2 on the basis of the access authority and the registration conditions of the printer 2. In this way, it is possible to improve user convenience and reduce the storage capacity of the printer 2. In addition, the host computer 1 includes a printer driver 12 that displays a color table on an interface screen on the basis of priority that is set for each user during a printing process, thereby improving user operability.

As shown in FIG. 1, in this embodiment, two host computers 1 are connected to one printer 2. The host computers 1 are for a user A and a user B, and have the same structure and function. In this embodiment, it is assumed that two users A and B use the printer 2 in order to simulate the output of a rotary press. Each of the host computers 1 registers a newly edited and generated color table to the printer 2 and instructs the printer 2 to perform a printing process using a selected color table. In this embodiment, the number of users is two, and two host computers 1 are connected to the printer 2. However, the invention is not limited thereto.

As described above, the host computer 1 is a host apparatus of the printer 2, and it may be composed of a general computer system, such as a personal computer. Therefore, although not shown in the drawings, the host computer includes, for example, a CPU, a ROM, a RAM, an HDD (hard disk drive), and a display device or an operating device serving as a user interface.

As shown in FIG. 1, the host computer 1 includes the printer utility 11 and the printer driver 12. The printer utility 11 enables the user to edit the color table stored in the printer 2 and registers a new edited color table in the printer 2. The color table means information used for the printer to perform a color conversion process. In this embodiment, for example, the color table is for converting RGB image data into CMYK image data. One main characteristic of the host computer 1 is the color table registration process of the printer utility 11, which will be described in detail below. In addition, the printer utility 11 includes, for example, a utility program that has process content described therein and is stored in the HDD, the CPU that performs a process according to the program, and the RAM.

The printer driver 12 instructs the printer 2 to perform printing. The printer driver 12 receives a print request from, for example, a predetermined application of the host computer 1, generates print data in response to the print request, and outputs the print data to the printer 2 such that the printer performs printing. During the print instruction process, an interface screen that allows the user to select a color table used is displayed, which is a characteristic of the invention. The details thereof will be described below. The printer driver 12 includes, for example, a driver program that has process content described therein and is stored in the HDD, the CPU that performs a process according to the program, and the RAM.

As shown in FIG. 1, the printer 2 is a so-called color laser printer that includes a controller 21 and a printing unit 22. The printer 2 receives a print instruction from the host computer 1, performs an instructed printing process, and registers a color table used in the printing process according to the above-mentioned registration process.

The controller 21 receives print data transmitted from the host computer 1, analyzes a control command included in the print data, and performs a predetermined process on image data included in the print data to generate data to be provided to the printing unit 22. As shown in FIG. 1, the controller 21 includes an I/F 23, a CPU 24, a ROM 25, a RAM 26, an engine I/F 27, and an HD 28.

The I/F 23 receives the print data transmitted from the host computer 1. The ROM 25 stores various programs that control the printer 2.

The RAM 26 is a memory that stores the received print data and image data processed by the controller 21 during various processes. The image data of each page printed by the printing unit 22 is transmitted from the RAM 26 to the engine I/F 27.

The CPU 24 controls various processes performed by the printer 2. In particular, the CPU performs a process of storing the image data included in the received print data in the RAM 26, a process of analyzing the control command included in the print data and instructing the printing unit 22 to perform an appropriate printing process, and a process of controlling an operating unit that forms an interface with the user. In addition, the CPU 24 performs the color table registration process and a color conversion process using a color table during printing. The CPU 24 mainly performs the processes according to the programs stored in the ROM 25.

The engine I/F 27 is an interface between the controller 21 and the printing unit 22. The engine I/F 27 reads the image data stored in the RAM 26 at predetermined timing when the printing unit 22 performs printing, performs a predetermined process on the read image data, and transmits the processed image data to the printing unit 22. Although not shown in the drawings, the engine I/F 27 includes, for example, a decompressing unit, a screen processing unit, and a pulse width modulating unit. The engine I/F 27 uses the units to perform a process of decompressing the read image data, a screen process, and a pulse width modulating process, and transmits the processed signals to the printing unit 22. Specifically, the engine I/F 27 is composed of an ASIC.

The HD 28 is a hard disk that stores various data or programs. The color table used for the color conversion process performed during printing is stored in the HD 28. As described above, since the printer 2 is used for the simulation of the rotary press, a plurality of color tables corresponding to the color characteristics of each rotary press is stored (registered) in the HD 28. Specifically, the initial states of standard color tables (1 to N) corresponding to the number (N) of rotary presses to be simulated are registered, and new color tables that are edited by the user and generated on the basis of each standard color table are registered such that they are linked to each standard color table. The newly generated color tables include a user color table which an authorized user accesses and a public color table which all the users access. The number of user color tables that can be registered is limited to the number of users, and the number of public color tables that can be registered is limited to 1, for each standard color table. In this embodiment, for example, since the number of users is two, three color tables, that is, a color table for user A, a color table for user B, and a public color table, can be registered for each standard color table.

FIG. 2 is a diagram illustrating an example of the registered color table. In FIG. 2, for example, 'standard 1:' shown on the left side indicates an address stored in the HD 28, and a color table shown on the right side of each address is stored at the address. In FIG. 2, for example, 'standard color table 1' indicates the name of a color table. Actually, the name of a color table and data of the color table, that is, information for a color conversion process are stored therein.

Standard color tables 1 to N corresponding to the above-mentioned rotary presses are stored at the addresses from 'standard 1:' to 'standard N:'. In addition, the user color tables and the public color table that are registered for the standard color table 1 are stored at addresses 'buffer 1:' to 'buffer 3:' shown in a lower part of FIG. 2. The three color tables stored in the buffers are generated on the basis of the standard color table 1, and form one group including the standard color table 1. That is, all the three color tables are for a rotary press corresponding to the standard color table 1.

In this embodiment, only the user color tables and the public color table are stored for the standard color table 1. However, as described above, these color tables can be registered for another standard color table. When these tables are registered, they are sequentially stored after the 'buffer 3:' in the same way as described above Similarly, each standard color table and the color tables stored in the buffer form a group corresponding to one rotary press.

New color tables that form a group different from those of the standard color tables 1 to N and are treated similarly with each standard color table can be registered at addresses 'custom 1:' to 'custom M:'.

As described above, the number of user color tables and public color tables that can be registered for each standard color table is limited since one rotary press is simulated by these color tables and a limited number of color tables most suitable for the rotary press at that time is used to perform the simulation. In addition, as described above, since the evaluation result of the output color of the same rotary press varies depending on the user, it is necessary to store individual user color tables for one rotary press, and the individual user color tables can be registered in one group. The use of the public color table is determined by agreement between a plurality of users and the public color table is common to the users. Therefore, in this case, a common public color table can be registered such that it is not necessary to register the color tables for the individual users.

As a rule, each user can edit, delete, and use only the user's own user color table. As a rule, only the users who register the public color table can edit and delete the public color table, but all the users can use it.

In this embodiment, as described above, the color table is for converting a color in an RGB format into another color in a CMYK format. Therefore, in the table, the grayscale values of C, Y, M, and K are determined to correspond to each color represented by a combination of the grayscale values of R, G, and B, that is, each color represented by the coordinates of a point in a three-dimensional RGB space.

A priority table for each user is stored in the HD 28. The priority table indicates the priority of the color tables displayed on the screen for selecting a color table used by the user during printing for each group based on each standard color table. The display priority is set such that, among the color tables registered in the group, the user color table has the highest priority, followed by the public color table and the standard color table.

FIG. 3 is a diagram illustrating an example of the priority table. FIG. 3 shows a priority table for the user A when each color table is registered as shown in FIG. 2. In FIG. 3, '1:' to 'N:' shown on the left side of the table correspond to the groups for the standard color tables 1 to N, and 'buffer 1:' on the right side thereof indicates the address shown in FIG. 2. That is, among the addresses at which the color tables registered at that time are stored, the leftmost address has the highest priority. In the group '1:' for the standard color table 1, as shown in FIG. 2, the user A can use three color tables, that is, the standard color table 1, the color table 1 for user A, and the public color table 1, and these color tables are displayed in the order of the color table 1 for user A, the public color table 1, and the standard color table 1 according to the above-mentioned priority. Therefore, the addresses at which the color tables can be stored are stored in the priority table in this order.

Therefore, only the color table having first priority for each group, that is, each rotary press is displayed. That is, the leftmost column of the priority table is displayed.

The priority table is stored for each user, and appropriately updated. In this embodiment, tables for the users A and B are stored.

Although not shown in the drawings, the printing unit 22 includes, for example, a charging unit, an exposure unit, a developing unit, a transfer unit, and a fixing unit. The CPU 24 instructs the printing unit 22 to perform a printing process on the basis of the signals received from the engine I/F 27, thereby printing an image corresponding to a print request on a predetermined printing medium.

The host computer 1 and the printer 2 having the above-mentioned structure according to this embodiment are characterized by a color table registration process and a process of selecting a color table during printing, which will be described in detail below.

Figure 4:
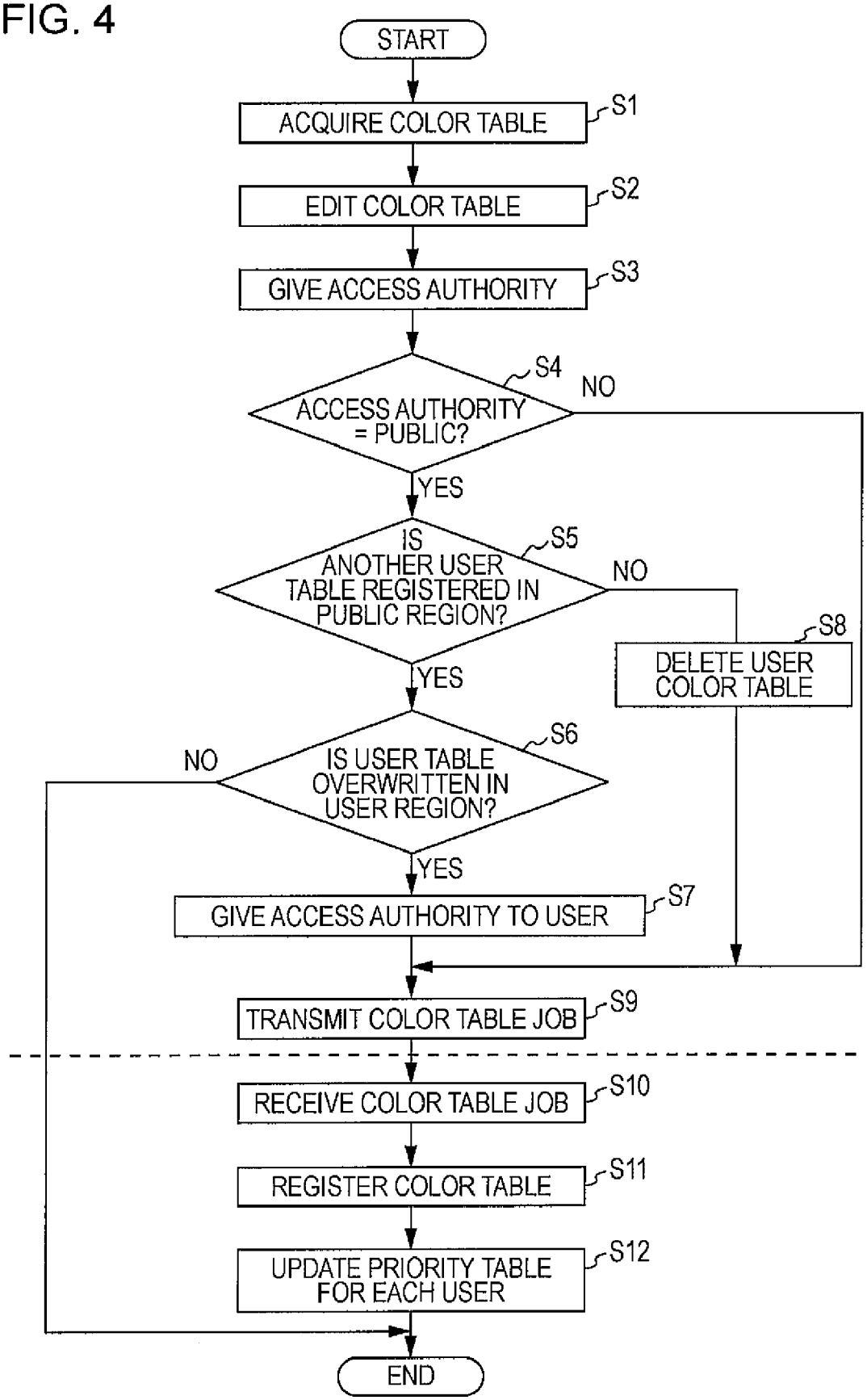
FIG. 4 is a flowchart illustrating an example of a color table registration process.

First, the color table registration process will be described. FIG. 4 is a flowchart illustrating an example of the color table registration process. In the color table registration process, first, a color table to be registered is generated. The color table is generated by editing the previously registered similar colors table, that is, the previously registered color tables in the same group. When the user inputs an edit request to the host computer 1, the printer utility 11 accesses the printer 2 to acquire the names of all the color tables registered at that time, and displays the color table names such that the user can select one of them. The color table names are displayed on a display device of the host computer 1.

When the user uses an operating device of the host computer 1 to select one of the displayed color tables, the printer utility 11 acquires data of the selected color table from the printer 2 (Step S1). Then, the printer utility 11 displays an interface screen for editing the acquired color table to the user such that the user edits the color table (Step S2). The color table is edited by appropriately changing the grayscale value of each color of C, Y, M, and K that are determined for each color represented by R, G, and B.

When the editing operation ends, the printer utility 11 generates a new color table on the basis of the edited content. Then, the printer utility prompts the user to input an access authority for the generated color table. When the user inputs the access authority, the printer utility adds information of the access authority to the color table (Step S3). Specifically, when the generated color table is used as a user color table, the user ID of the user who edits the color table is input. When the generated color table is used as the public color table, information indicating that the generated color table is used as the public color table is input. Then, the printer utility 11 determines whether to use the generated color table as the color table for user A, the color table for user B, or the public color table, on the basis of the input information, and adds the information to the table.

Then, the printer utility 11 determines whether the generated color table can be registered and a registration position. First, when the added access authority is not public authority, that is, when the generated color table is used as the user color table of a user (No of Step S4), the printer utility 11 determines that the generated color table can be registered without any change, and the process proceeds to Step S9.

When the added access authority is public authority, that is, when the generated color table is the public color table (Yes of Step S4), first, the printer utility 11 accesses the printer 2 to check whether the public color table registered by each user has already been stored in an area of the HD 28 in which the generated color table will be stored (Step S5). Specifically, the printer utility 11 checks all the color tables stored in the HD 28 for the group including the original color table used for the process of editing the generated color table (Step S2).

As the check result, when it is determined that the public color table registered by each user has not been stored (No of Step S5), the printer utility determines that the generated color table is registered as the public color table and determines to delete the user color table of the user in the same group (Step S8). For example, when the user A generates a new color table on the basis of the standard color table 1 and there is no public color table (public color table 1) for the standard color table 1 registered by the user B, the printer utility registers the generated color table as the public color table 1. When there is the color table 1 for user A at that time, the printer utility determines to delete the color table. In this case, the delete instruction is added to a color table job, which will be described below.

The generated color table is up-to-date information corresponding to the latest state of the corresponding rotary press in the group, and the user, who is an editor, may use only the up-to-date information at that time. Therefore, the previously registered user color table is deleted to reduce the storage area of the color table in the HD 28.

Then, the process proceeds to Step S9.

When it is checked in Step S5 that the public color table registered by each user has been stored (Yes of Step S5), the printer utility 11 determines that the generated color table cannot be registered as the public color table, and displays a message asking whether to change the generated color table to the user color table in the same group and register it to the user (Step S6). When the user inputs information indicating that the user does not want to register the color table in response to the displayed message (No of Step S6), the registration process ends. In this case, for example, when the user color table of the user has already been stored, the printer utility determines that the color table is not overwritten and ends the process.

On the other hand, when the user inputs information indicating the registration of the color table (Yes of Step S6), the printer utility 11 changes the added access authority information to information indicating that the generated color table is used as the user color table of the user (Step S7). Then, the process proceeds to Step S9.

Figure 5:
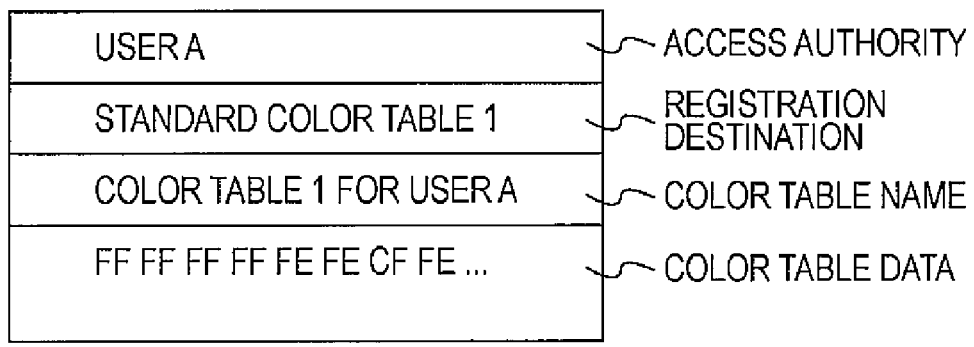
FIG. 5 is a diagram illustrating an example of a generated color table job.

In this way, when the process proceeds to Step S9, the printer utility 11 generates a color table job such that the generated color table can be registered in the printer 2 as a table to which access authority is given in each of the above-mentioned cases, and transmits the color table job to the printer 2 (Step S9). FIG. 5 is a diagram illustrating an example of the generated color table job. As shown in FIG. 5, the color table job includes access authority information, a registration destination, that is, information of the group to be registered, a color table name, and actual color table data. In the example shown in FIG. 5, an instruction to register the color table 1 for user A for the standard color table 1 is issued. In the example shown in FIG. 2, an instruction to store the current color table at the address 'buffer 1:' is issued. As described above, when Step S8 is performed, information indicating the deletion of the user color table of the user who performs editing in the same group is added to the job.

When the job is transmitted in this way, the printer 2 receives the job (Step S10), and registers the newly transmitted color table on the basis of the color table job (Step S11). The CPU 24 controls the registration process and a process of updating the priority table, which will be described below.

The color table is registered by analyzing the content of the color table job and storing a new color table in a predetermined area of the HD 28. When a table has already been stored in a storage area, an overwrite process is performed. In addition, when a delete instruction is issued in Step S8, a designated user color table is deleted in response to the instruction.

Then, the printer utility performs a process of updating the priority table for each user (Step S12). That is, the printer utility updates the content of the priority table according to the registration state of the color table after the registration process.

In this way, the registration process of a newly generated color table ends. When it is checked in Step S5 that the public color table for each user has already been stored, the generated color table is not registered as the public color table because the public color table is generated after it passes through sufficient examination such that it is common to all the users and it is not easily updated by one user. Therefore, in this case, in order to register the generated color table as the public color table, it is necessary to perform the registration process after the user who registers the public color table deletes the color table. In this way, it is possible to prevent the content of the public color table from being unnecessarily changed.

Figure 6:
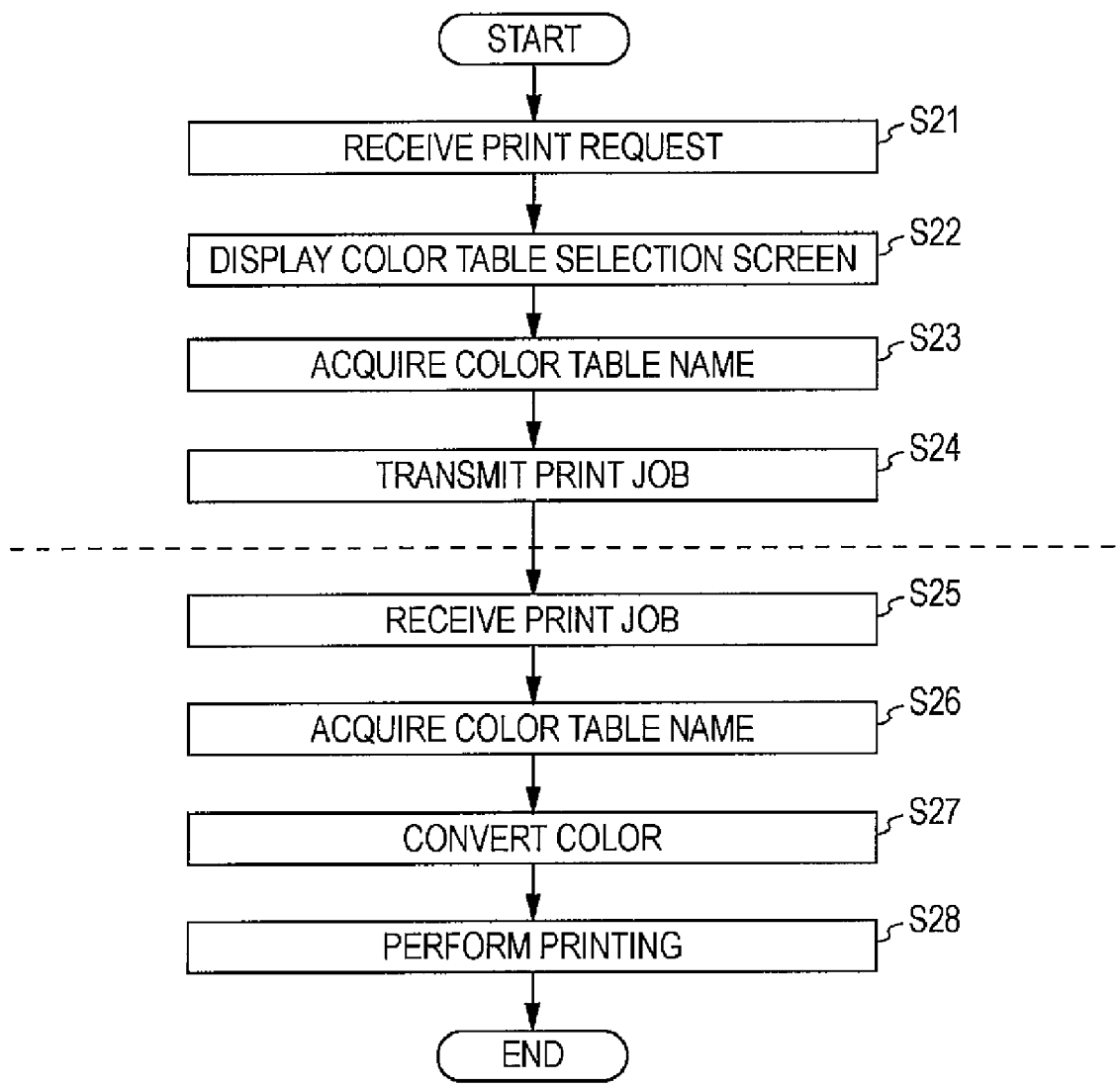
FIG. 6 is a flowchart illustrating an example of a printing process.

Next, the content of the printing process will be described. FIG. 6 is a flowchart illustrating an example of the printing process. First, the user inputs a print request to the host computer 1. When the printer driver 12 receives the print request (Step S21), the printer driver 12 displays a user interface screen for setting various print conditions on the display device of the host computer 1. The screen includes a portion that enables the user to select a color table used for the requested printing job.

When the user inputs an instruction to select a color table together with a user ID to the screen, the printer driver 12 accesses the priority table of the user indicated by the input user ID in the printer 2 to acquire the addresses of the color tables whose names will be displayed as selection options on the screen in the HD 28. Then, the printer driver acquires the name of each color table stored at the acquired address and displays it on the user interface screen such that the user can select it (Step S22). As described above, only the color table having the highest priority for the user in each group is displayed. In the case of the priority table shown in FIG. 3, the address of the priority table is acquired from the leftmost column.

FIGS. 7A to 7D, FIGS. 8A to 8D, and FIGS. 9A to 9D are diagrams illustrating examples of the display of the selection of a color table. FIGS. 7A, 8A, and 9A show the display of the selection of a color table when the user A requests printing. FIGS. 7B, 8B, and 9B show the display of the selection of a color table when the user B requests printing. FIGS. 7C, 8C, and 9C show the color tables stored in the printer 2 at that time. FIGS. 7D, 8D, and 9D show the priority table of the user A stored in the printer 2 at that time.

As shown in FIG. 7C, three color tables, that is, the color table 1 for user A, the color table 1 for user B, and the public color table 1 are registered for a group of the standard color table 1. In the priority table of the user A shown in FIG. 7D, the color table 1 for user A stored at the address 'buffer 1:' is displayed for the group of the standard color table 1 on the basis of the above-mentioned priority. Therefore, the color table 1 for user A is displayed in a portion X of FIG. 7A, that is, in a portion displayed as a selection option for the group of the standard color table 1. In addition, for other groups, each standard color table is displayed from the content of the leftmost column of FIG. 7D. In the case of the user B, although the priority table is not shown, the color table 1 for user B stored at the address 'buffer 2:' has the first priority for the group of the standard color table 1, and is displayed as a selection option, as shown in FIG. 7B.

As shown in FIG. 8C, two color tables, that is, the color table 1 for user B and the public color table 1 are registered for the group of the standard color table 1. In the priority table of the user A shown in FIG. 8D, the public color table 1 stored at the address 'buffer 2:' is displayed for the group of the standard color table 1 on the basis of the above-mentioned priority. Therefore, the public color table 1 is displayed in a portion Y of FIG. 8A, that is, in a portion displayed as a selection option for the group of the standard color table 1. In the case of the user B, the color table 1 for user B stored at the address 'buffer 1:' has the first priority for the group of the standard color table 1, and is displayed as a selection option, as shown in FIG. 8B.

As shown in FIG. 9C, only the color table 1 for user B is registered for the group of the standard color table 1. In the priority table of the user A shown in FIG. 9D, the standard color table 1 stored at the address 'standard 1:' is displayed for the group of the standard color table 1 on the basis of the above-mentioned priority. Therefore, the standard color table 1 is displayed in a portion Z of FIG. 9A, that is, in a portion displayed as a selection option for the group of the standard color table 1. In the case of the user B, the color table 1 for user B stored at the address 'buffer 1:' has the first priority for the group of the standard color table 1, and is displayed as a selection option, as shown in FIG. 9B.

When a color table selection interface is displayed in this way, the user selects the color table that is currently used from the selection options. That is, the user selects a rotary press to be simulated. Specifically, the user uses the operating device to designate one of the names of the displayed color tables.

When the user selects the color table, the printer driver 12 generates print data (print job) for instructing the printer 2 to perform printing. The print job includes control commands for controlling the printing process of the printer 2, such as image data (print data) to be printed and print conditions. The printer driver acquires the name of the selected color table (Step S23), and inserts the name as a control command for designating a color table into the print job. The control commands related to the other print conditions are generated on the basis of information input to the user interface screen by the user, and are inserted into the print job. In addition, when the print request is received, the printer driver processes the data received from, for example, an application of the host computer 1 into data for the printer 2, thereby generating the print data.

Figure 10:
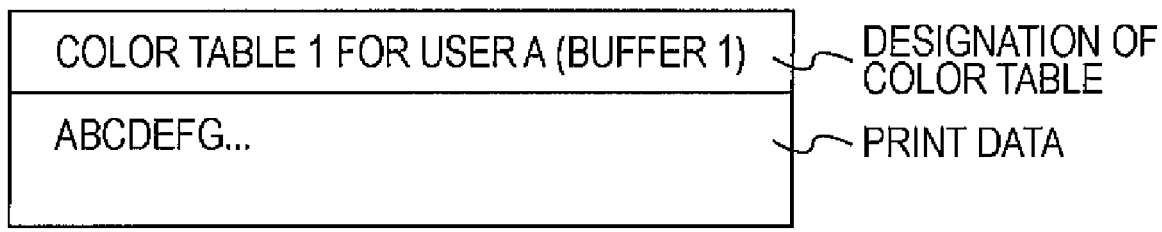
FIG. 10 is a diagram illustrating an example of a transmitted print job.

When the print job is generated in this way, the printer driver 12 transmits the print jot to the printer 2 (Step S24). FIG. 10 is a diagram illustrating an example of the transmitted print job. In the example shown in FIG. 10, the color table 1 for user A is selected as the color table, that is, the group of the standard color table 1 is selected. In FIG. 10, the other control commands are omitted.

The printer 2 receives the transmitted print job (Step S25). The controller 21 analyzes the control command and performs various image processing operations on the print data according to the control command. During the image processing operations, the name of the color table used for the current printing process is acquired from the control command for designating a color table (Step S26), and a color conversion process for the print data is performed using a color table corresponding to the name (Step S27). The image processing including the color conversion process can be performed in various ways. For example, the image processing is performed in the order of a process of expanding image data for the image of each object to data for each pixel, a process of converting the color of the expanded data, that is, a process of converting the color from an RGB format to a CMYK format, and a compression process. The data subjected to the image processing is stored in RAM 26 until it is transmitted to the engine I/F 27.

Then, at the time when the printing unit 22 processes the data, the data stored in the RAM 26 is read out, and the engine I/F 27 performs the above-mentioned various processes on the data. Then, the processed signals are transmitted to the printing unit 22. All components of the printing unit 22 are operated on the basis of the signals to print an image on a printing medium (Step S28).

In this way, the printing process is performed.

As described above, in the host computer 1 according to this embodiment, the printer utility 11 can register a plurality of color tables for the color conversion process performed during printing, that is, the user color tables and the public color table. Therefore, when the color tables are used to simulate a plurality of rotary presses, it is possible to improve user convenience. In addition, since access authority is given to each user, it is possible to prevent the user's own color table from being changed by an unauthorized user. In addition, since public access authority is given to a common color table and all the users can share the common color table, each user does not need to have the common color table. Therefore, it is possible to reduce the data storage capacity of the printer 2.

Since the number of color tables that can be registered is limited, it is also possible to reduce the data storage capacity of the printer 2. In this case, when the color tables are used to simulate the rotary presses, up-to-date information is stored. Therefore, there is no problem in the simulation.

When a common table is newly registered in the same group of the color tables, that is, in the same rotary press, the user color table registered in the same group by the user who registers the table is deleted. In this way, it is possible to reduce the use of the hardware resources of the printer 2.

Among each group of the color tables registered for each user, only the color table having the highest priority is displayed on the user interface screen for selecting a color table used during printing. Therefore, the selecting operation of the user is not complicated. As a result, it is possible to improve user operability.

In the above-described embodiment, the color table is information used to convert a color from an RGB format into a CMYK format, but the invention is not limited thereto. For example, the color table may be information for adjusting the output color of input image data, such as information for changing the grayscale value of each color of data in the CMYK format.

In the above-described embodiment, the host computer 1 issues an instruction to register a color table, and the printer 2 stores the color table registered according to the instruction. However, the host computer may store a color table. Then, during printing, the host computer may perform the image processing including the color conversion process using the color table, and transmit the processed data to the printer. In this case, when the color table and the priority table are stored in different areas, a color table registration process and a process of displaying selection options during printing are performed in the same way as described above. Therefore, the invention can also be applied to a so-called printer server.

The scope of the invention is not limited to the above-described embodiments, but should be defined by the appended claims and equivalents thereof.

The entire disclosure of Japanese Patent Application No. 2008-165939, filed Jun. 25, 2008 is expressly incorporated by reference herein.

What is claimed is:

1. A print control device that controls a printing process using registered color conversion information, comprising:
   a generating unit that, when a user edits the registered color conversion information, adds access authority information indicating that the color conversion information is user color conversion information used by only a predetermined user or common color conversion information that can be used by all users to the color conversion information to generate new edited color conversion information; and
   a registration unit that determines whether the edited color conversion information generated by the generating unit can be registered and whether the edited color conversion information is registered as the user color conversion information or the common color conversion information, on the basis of the access authority information and the registration state of the color conversion information, and registers the edited color conversion information on the basis of the determination result.

2. The print control device according to claim 1, wherein the edited color conversion information is generated for each of one or more standard color conversion information items, and
   the number of edited color conversion information items registered for each standard color conversion information is limited.

3. The print control device according to claim 2, wherein, when the registration unit determines that the edited color conversion information is registered as the common color conversion information and the user color conversion information of the user who has performed the editing operation has already been registered for the standard color conversion information for which the edited color conversion information is registered, the user color conversion information is deleted.

4. The print control device according to claim 2, further comprising:
   a display unit that, when receiving a request to perform the printing process, displays an interface screen that allows the user to select the color conversion information used for the printing process,
   wherein, for the color conversion information that can be used by the user who requests the printing process, the name of the standard color conversion information and the name of one color conversion information item having the highest priority among the edited color conversion information items registered for the standard color conversion information are displayed for each standard color conversion information on the interface screen.

5. A computer readable record medium encoded a print control program that allows a computer for controlling a printing process using registered color conversion information to perform the functions of:
   when a user edits the registered color conversion information, adding access authority information indicating that the color conversion information is user color conversion information used by only a predetermined user or common color conversion information that can be used by all users to the color conversion information to generate new edited color conversion information; and
   determining whether the generated edited color conversion information can be registered and whether the generated edited color conversion information is registered as the user color conversion information or the common color conversion information, on the basis of the access authority information and the registration state of the color conversion information, and registering the edited color conversion information on the basis of the determination result.

* * * * *